United States Patent Office 3,715,130
Patented Feb. 6, 1973

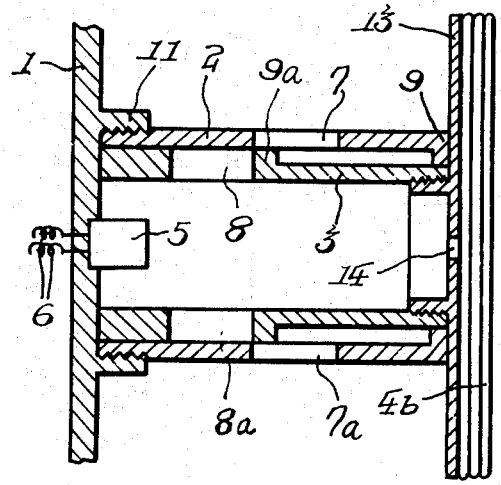
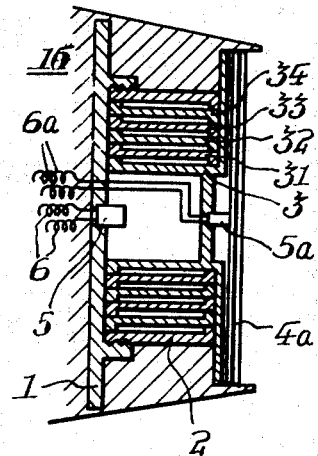
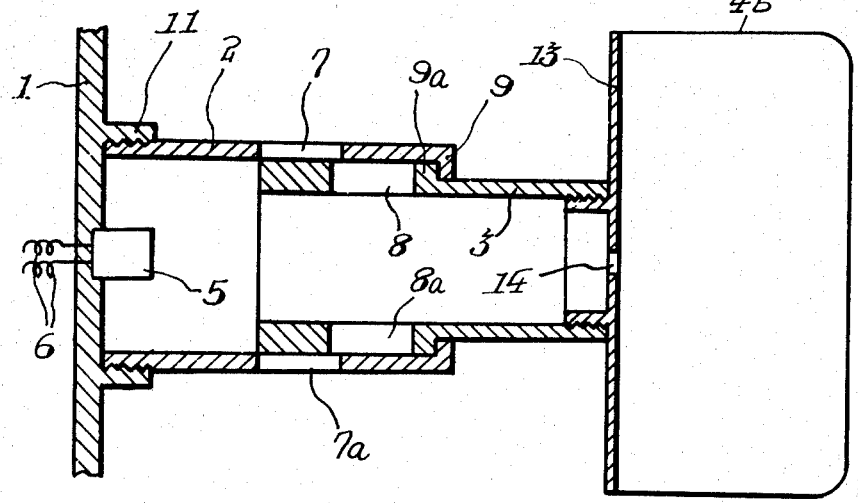

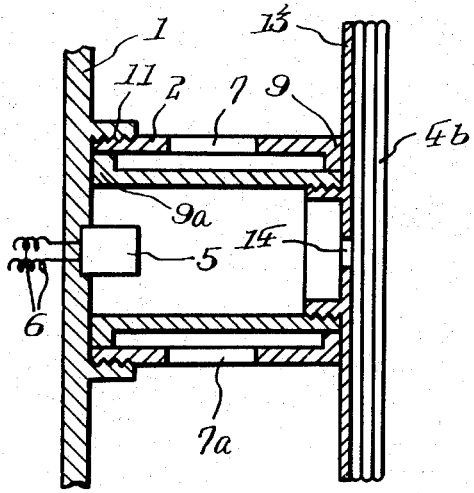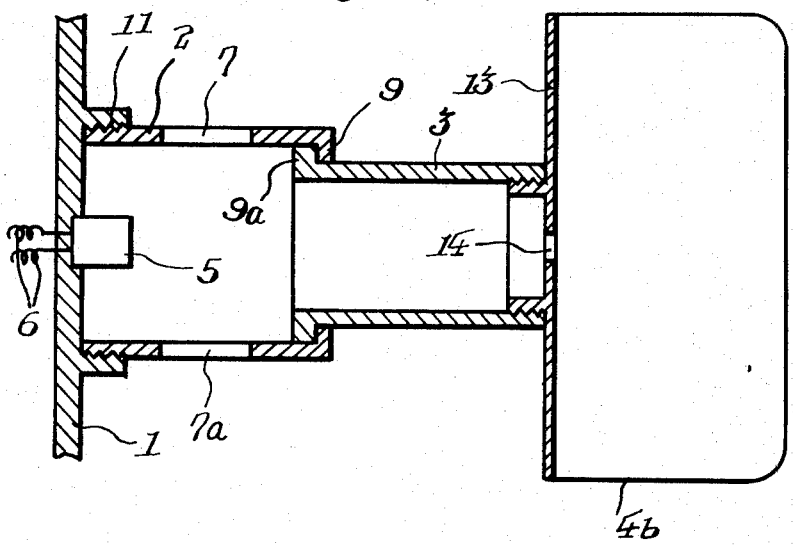

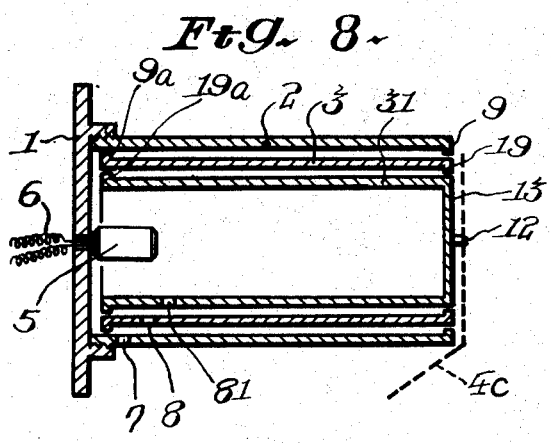
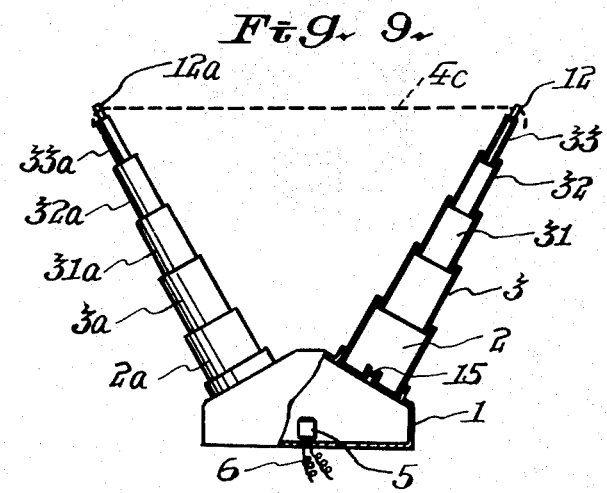
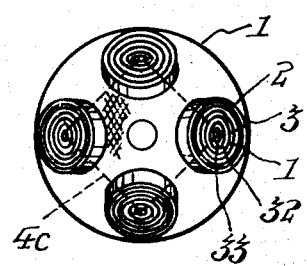

3,715,130
SHOCK ABSORBING DEVICE FOR PROTECTING A RIDER IN A HIGH SPEED VEHICLE SUCH AS AUTOMOBILE
Ikuo Harada, 5-6-1 Minamisawa, Kurume-cho, Tokyo, Japan; and Masabumi Hamazaki, 5003-14 Midorigaoka, Nobeoka-shi; and Nobuyuki Isawa, 607-3 Midorigaoka, Nobeoka-shi, both of Nobeoka, Japan
Filed Nov. 2, 1970, Ser. No. 86,201
Claims priority, application Japan, Nov. 5, 1969, 44/88,060; Feb. 24, 1970, 45/15,187; Aug. 5, 1970, 45/68,009
Int. Cl. B60r 21/10
U.S. Cl. 280—150 AB                                    2 Claims

ABSTRACT OF THE DISCLOSURE

A shock absorbing device designed to prop the rider's body in a collision of the vehicle and including a telescopically extensible structure or structures each comprised of a plurality of slidably interfitting tubular members. In a collision, high gas pressure is produced in the structure by gas producing means operable in association with a shock sensor provided therefore to cause the structure to extend quickly. Various forms of cushion or pad can be secured to one of the tubular members of the structure which extends outermost in operation to softly support the rider's body when it is thrown forward.

---

This invention relates to shock absorbing device designed to protect the driver or other occupant of an automobile or other high speed vehicle in a collision.

BACKGROUND OF THE INVENTION

In recent years, various attempts have been made to eliminate or reduce the casualties of automobile accidents by employing an inflatable bag in the vehicle for the purpose of softening the shock or force of a collision which acts upon the driver or other occupant of the vehicle. As disclosed, for example, in the U.S. Pat. No. 3,336,045, the bag normally collapsed or folded up is rapidly expansible under the gas pressure fed or produced in the bag at the instant of a collision of the vehicle to softly prop the driver's body.

Such bag, however, is required to have a considerably large capacity in order to effectively alleviate the shock of collision and hence its use in the vehicle, which is substantially closed to the exterior atmosphere, inevitably involves physical dangers such as of rupturing the rider's tympanums on account of the sound or substantial rise of the atmospheric pressure naturally caused in the vehicle by the expanding bag. To cope with this situation, some measure must be resorted to, for example, to break open the rear window glass of the car at the instant of the collision and this disadvantageously causes increase in cost and loss of reliability of the device.

THE DISCLOSURE OF THE INVENTION

Accordingly, the present invention has for its primary object to provide a shock absorbing device which includes a tubular telescoping structure comprised of a plurality of slidably interfitted tubular members and a gas producing unit including an explosive mixture or other gas producing agent and operable under the shock in a collision of the vehicle to produce pressure gases in the telescoping structure enough to extend its length and thus can serve to prop the rider's body softly under the elastic effect of the pressure gases confined in the telescoping structure and the cushioning effect of a pad or cushion means as secured to the movable tubular member of the structure.

Another object of the present invention is to provide a shock absorbing device of the character described in which the tubular telescoping structure is provided with the vent means for allowing the pressure gases fed in the tubular structure to leak out thereby to control the damping effect of the gases upon the speed of contraction of the telescoping structure so as to effectively alleviate the shock or force of collision given to the rider's body.

A further object of the present invention is to provide a shock absorbing device of the character described in which the cushion means secured to the movable tubular member of the telescoping structure takes the form of a bag which is normally in a folded or collapsed state but is inflatable with the pressure gases acting to extend the telescoping structure to softly prop the human body.

Yet another object of the present invention is to provide a shock absorbing device of the character described which includes a plurality of radially arranged tubular telescoping structures jointly carrying a mesh fabric or the like and extensible under gas pressure to stretch out the fabric for supporting engagement with the rider's body.

These and other objects, features and advantages of the present invention will become apparent from the following description when taken in conjunction with the accompanying drawings, which illustrate a number of preferred embodiments of the invention and in which like reference numerals indicate like parts throughout the figures.

In the drawings:

FIG. 3 is a view similar to FIGS. 1 and 2, illustrating another embodiment of the present invention including a telescopically extensible structure comprised of a fixed tubular member and a multitude of movable tubular members;

FIG. 4 is a longitudinal cross-sectional view of a further embodiment of the invention which includes a telescopically extensible structure among others comprising a movable tubular member and a cushioning member attached thereto and taking the form of a bag inflatable with gases produced within the extensible structure;

FIG. 5 illustrates the embodiment of FIG. 4 in its extended state;

FIGS. 6 and 7 illustrates a modification of the embodiment of FIGS. 4 and 5, including a modified form of vent means; and FIGS. 8 to 13 illustrate a few further embodiments of the invention employing a stretchable net or cloth as a cushioning member for supporting engagement with the rider's body;

Figure 11:
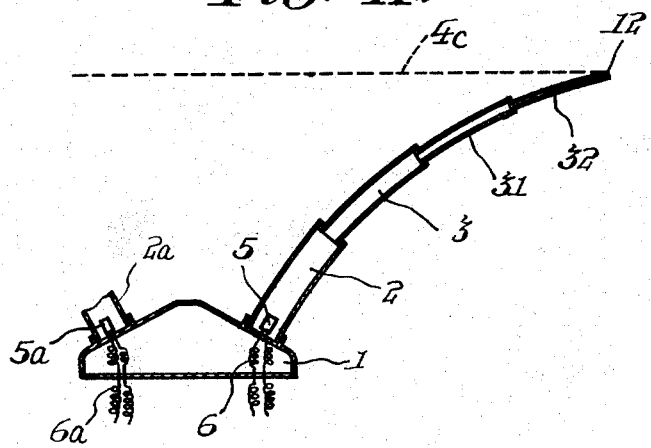
Figure 12:
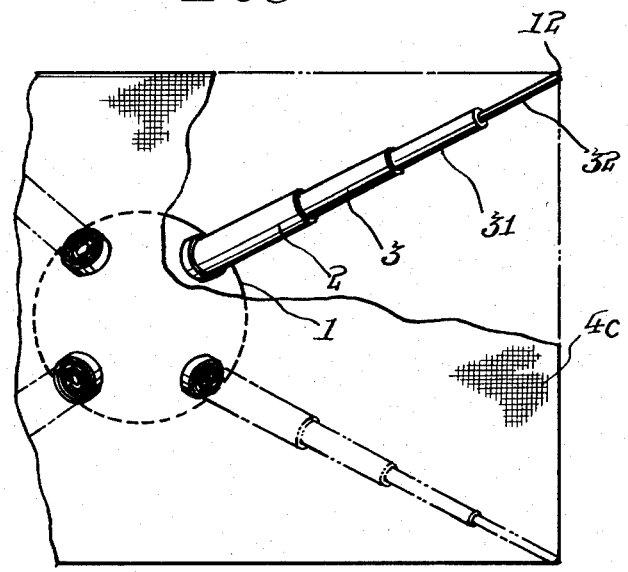
Figure 13:
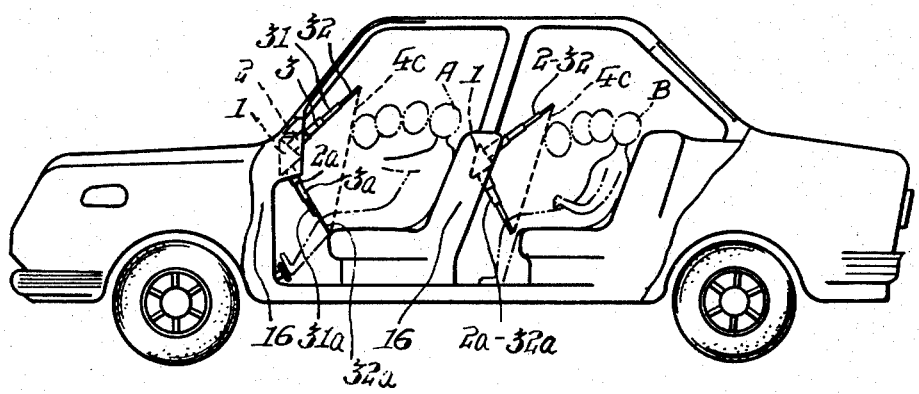

FIG. 8 showing the manner in which a net is secured to the extensible multi-tubular structure;

FIG. 9 representing a side elevation, partly in section, of the shock absorbing device with its net stretched out;

FIG. 10 representing a plan view of the device of FIG. 9 showing its multi-tubular structures in their normal contracted state with the net shrunk;

FIG. 11 representing a fragmentary longitudinal cross section of a modification of the embodiment shown in FIGS. 9 and 10, which includes extensible multi-tubular structures each comprised of curved tubular members, and showing such modification in its state extended in use;

FIG. 12 representing a fragmentary plan view of the device of FIG. 11 with its mesh fabric shown partly broken; and FIG. 13 representing a cutaway side view of an automobile equipped with shock absorbing devices of the form shown in FIGS. 9 and 10.

Figure 1:
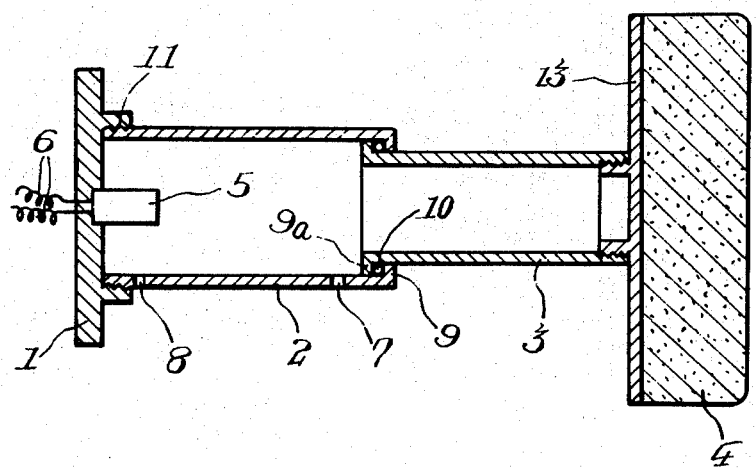
FIG. 1 represents a longitudinal cross-sectional view of one embodiment of the invention which includes a telescopically extensible structure comprised of a fixed tubular member and a single movable tubular member.

Referring to the drawings and first to FIG. 1, reference numeral 1 indicates a base plate firmly secured to the frame of an automobile or other high speed vehicle and to which a stationary hollow cylindrical member 2 is secured as by threaded means 11. Slidably fitted in the stationary hollow cylindrical member 2 is a movable hollow cylindrical member 3, which is closed at its outer end by an end plate 13 carrying a soft cushion or pad 4, for example, of foamed synthetic resin such as polyurethane or polystyrene. As will readily be understood, the stationary and movable cylindrical members 2 and 3 together form a telescopically extensible structure. The stationary cylindrical member 2 is formed at its outer end with a radially inwardly extending flange 9 while the movable cylindrical member 3 is formed at its inner end with a radially outwardly extending flange 9a.

In this manner, the stationary and movable cylindrical members together form a telescopically extensible tubular structure.

As shown, the flanges 9 and 9a are engageable with each other to limit the extended length of the tubular structure. An O-ring 10 of rubber is interposed between the flanges 9 and 9a to serve as a cushion when the structure is fully extended and also as a sealing means between the stationary and movable cylindrical members 2 and 3.

A gas producing means 5 is provided on the base plate 1 inside the fixed cylindrical member 2 and includes an explosive mixture or valve means for introducing combustion gases, compressed gases or other high pressure gases into the space within the telescoping structure. As shown, the gas producing means 5 is provided with ignition leads 6, which are connected to a voltage source and a shock sensor switch operable in a collision of the vehicle.

The stationary cylindrical member 2 has vent holes 7 and 8 of limited diameters formed in its side wall adjacent to the opposite ends of the member. The hole or holes 8 are made smaller in diameter than hole or holes 7 in order to increase the shock absorbing effect of the device.

When and if the automobile or other vehicle equipped with the above-described shock absorbing device comes to stop suddenly in a head-on or rear-end collision the switch of the shock sensor will be closed to complete the operating circuit of gas producing means 5, causing the latter to produce gases. The pressure of the gases acting upon the movable cylindrical member 3 causes the latter to slide rapidly to the right as viewed in FIG. 1 and thus the tubular structure is extended. On this occasion, as soon as the end flange 9a on the movable cylinder 3 passes over the vent hole or holes 7 formed in the stationary cylinder 2, the pressure gases within the structure, previously permitted to escape only through vent hole or holes 8, begin to leak out additionally through vent holes 7 and the corresponding rapid decrease in the gas pressure causes a substantial decrease in the sliding speed of the movable member 3 thereby to effectively alleviate the impacting force of the end plate 13 and cushion 4 acting upon the rider's body when they come into propping engagement therewith.

After the full engagement of the cushion 4 with the rider's body, the movable cylindrical member 3 apparently recoils into the stationary member 2. On this occasion, after the instant when the end flange 9a on the movable member 3 passes over the vent holes 7 formed in the stationary member 2, the space within the structure will be in communication with the exterior atmosphere only through the vent holes 8 of relatively small diameter and the recoiling speed of the movable member 3 effective reduced. This apparently results in increase in the shock absorbing effect of the device in combination with the cushioning effect of the mass of gases remaining in the structure.

Figure 2:
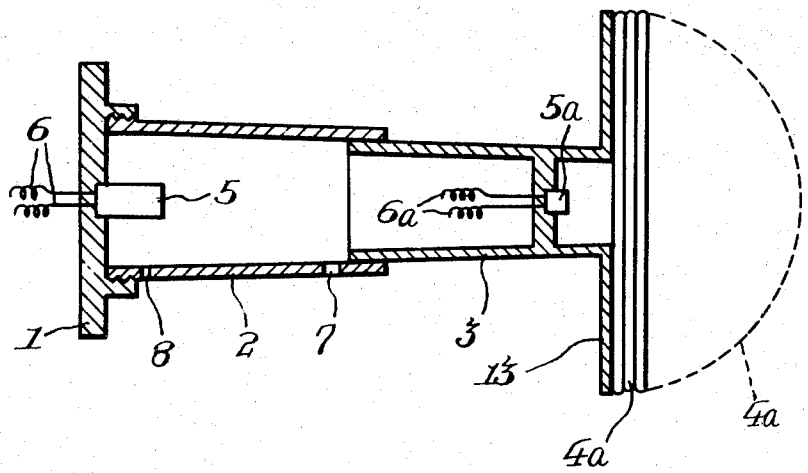
FIG. 2 is a view similar to FIG. 1 illustrating a modification of the embodiment of FIG. 1 in which the tubular structure is frusto-conical in shape.

Reference will next be made to FIG. 2, which illustrates a modification of the device shown in FIG. 1. In this modification, frusto-conical interfitting tubular members are employed in place of the cylindrical stationary and movable members of the FIG. 1 device. When the movable frusto-conical member 2 is extended, its inner end portion finally comes into close fitting engagement with the outer end portion of the stationary frusto-conical member 2, as shown, thereby limiting the sliding extent of the movable member 3. This makes it possible to do without interengaging flanges such as indicated in FIG. 1 by 9 and 9a.

Secured to the outer end of the movable frusto-conical tubular member 3 is an end plate 13 carrying a bag 4a, which is normally folded as shown by the solid lines but in operation is inflated into a hemispherical shape, with pressure gases produced therein, as indicated by the broken line 4a, and thus serves as a cushioning means to softly support the rider's body being thrown forward.

As a pressure gas source for such inflatable bag 4a a gas producing element 5a is arranged in a recess formed in the end plate 13 and to which element electric conductors 6a are connected. The conductors are connected also to a shock sensor switch and a voltage source, both not shown, either in parallel or in series with the conductors 6 connected to the gas producing means 5 arranged in the tubular structure 2–3.

The bag 4a is made of rubber or other stretchable material but it is recommendable to form at least a portion of the bag of a more or less air-permeable fabric material in order to obtain an increased cushioning or shock absorbing effect.

In operation of the device of FIG. 2, the gas producing elements 5 and 5a are simultaneously energized through the conductors 6 and 6a, upon the closing of the shock sensor switch, which is operable at the instant of collision of the automobile or a like vehicle. As a result, the space within the stationary member 2 is filled with pressure gases causing the movable member 3 to slide to its extended position shown in FIG. 2 and at the same time the bag 4a, being fed with gases produced by the element 5a, is inflated as indicated by the broken line to bear softly against the rider's body. As with the case of the embodiment of FIG. 1, the movable member 3 recoils immediately after the impacting engagement of the bag with the human body to compress the gases in the tubular structure 2–3, thus causing the gases to leak out into the atmosphere through the vent holes 7 and through those 8 of reduced diameter, and the desired cushioning effect is obtained.

A further embodiment of the invention shown in FIG. 3 includes a stationary tubular member 2 fixed to a mounting or base plate 1 and a plurality of interfitting movable tubular members 3, 31, 32, 33 and 34 slidably fitted in the stationary member 2 and is secured to the dashboard or seat back 16 of an automobile with the movable tubular members wholly received in the stationary member 2. As with the case of the embodiment of FIG. 2, gas producing elements 5 and 5a are provided which are operable by switch means of a shock sensor device, not shown, through the intermediary of conductors 6 and 6a and the cushioning bag 4a is inflatable with pressure gases produced by one of the gas producing elements 5a, which is properly fitted in the end plate 13 integral with the innermost movable tubular member 3. Only in this case, however, the multiple movable tubular members 3, 31, 32, 33 and 34 are actuated under the pressure of the gases produced by the gas producing element 5 to slide instantaneously to the right, as viewed in FIG. 3, in rapid succession. The gases in the multi-tubular structure thus extended subsequently act as a cushioning means when the structure is subsequently contracted, as with the case of the aforedescribed embodiments.

FIG. 4 illustrates another embodiment of the invention, which includes a stationary cylinder 2 fixed to the mounting plate 1 by thread means 11, a movable cylinder 3 slidably fitted in the stationary cylinder 2 and closed at the outer end by an end plate 13 having a central aperture 14, and a protecting bag 4b secured to the end plate 13 to support the rider's body. In the stationary cylinder 2, a gas producing element 5 is provided as in the embodiments described hereinbefore to produce gases, which in this case not only act to extend the tubular structures 2–3 but are fed through aperture 14 into the protecting bag 4b.

Vent means comprising holes 7, 7a, and 8, 8a of a relatively large diameter are formed on the side wall of the stationary and movable cylinders 2 and 3, respectively, such that the exhaust of pressure gases and the suction of atmospheric air into the cavity created by the interfitting of the tubular structures 2 and 3 might be achieved. When the tubular structures 2 and 3 expand by a pressure gas produced from the gas producing means 5, vent holes 7, 7a on the side wall of the stationary cylinder 2 and vent holes 8, 8a on the side wall of the movable cylinder 3 overlap with each other. As the area of overlap increases, the area of the gas path correspondingly increases such that there is a gradual increase in the suction of atmospheric air into the cavity. When both holes 7, 7a and 8, 8a overlap completely, the area of gas path reaches a maximum and then gradually decreases according to the movement of the cylinder 3. When the cylinder 3 is totaly extended, the area of gas path becomes 0. Consequently, it can be seen that by means of the relative motion of the stationary and movable cylinders 2 and 3, the amount of atmospheric air entering into the cavity through holes 7, 7a and 8, 8a is automatically controlled. Consequently, the final gas mixture contained within the cavity which comprises a combination of the produced gas and atmospheric gas is similarly controlled.

The bag 4b is preferably formed of nylon or other high strength fabric cloth and is normally folded as shown but, upon operation of the shock sensor device and hence of gas producing element 5 connected therewith through conductors 6, a mixture of the pressure gases produced in the tubular structure 2–3 and the atmospheric air drawn therein by the movable member 3 sliding under the gas pressure is fed through the aperture 14 into the bag 4b to inflate it into the state shown in FIG. 5. Combined suction and exhaust vent holes 7, 7a and 8, 8a are automatically controlled by the sliding movement of the movable member 3 relative to stationary cylinder 2. That is, they serve as suction holes allowing suction of the atmospheric air into the tubular structure when the movable member 3 thereof slides to the right while serving as exhaust holes allowing release into the atmosphere of the gases remaining in the structure 2–3 and bag 4b when the movable cylinder 3 subsequently recoils into the stationary cylinder 2.

Thus, in a collision of the vehicle equipped with the device, the tubular structure 2–3 extending under the pressure of gases produced therein draws in atmospheric air through holes 7, 7a and 8, 8a to form a gas-air mixture and the bag 4b being fed with such mixture is inflated at an accordingly increased rate. The impact of the inflated bag 4b against the rider's body is effectively alleviated by the elasticity of the gaseous mixture held in the bag 4b and the telescoping tubular structure 2–3. Apparently, the bag 4b is compressed at the instant of impact and the movable cylinder 3 starts to retreat. The retreating speed of the tubular member 3 is automatically controlled by the vent holes 7, 7a and 8, 8a which allow the gas-air mixture held in the structure 2–3 and bag 4b to flow out in limited quantities so that the shock to be imparted to the rider's body is effectively alleviated.

FIGS. 6 and 7 illustrate a modification of the embodiment of FIGS. 4 and 5, in which only the stationary cylinder 2 is formed with vent holes as at 7 and 7a providing for the exhaust of pressure gases and the suction of atmospheric air. Such vent means are substantially the same in function and effect as those in the previous embodiment.

Refering next to FIGS. 8 to 13, description will be made of some further embodiments of the invention utilizing a stretchable net or fabric cloth as a cushioning member for yieldingly support the rider's body.

In FIG. 8, reference numeral 1 indicates a mounting base plate; 2 a stationary tubular member; 3 and 31 slidably interfitting movable tubular members received in stationary member 2. The extended length of the telescoping structure shown is limited by flange means provided on the respective tubular members, including a flange 9 formed on the stationary member 2 at its outer end, a flange 9a formed on the first movable member 3 at its inner end to engage with the flange 9 on member 2, a flange 19 formed on the first movable member 3 at its outer end, and a flange 19a formed on the second movable member 31 at its inner end and engageable with the outer end flange 19 of the first movable member 3. Provided on the base plate 1 is a gas producing element 5, for example, utilizing an explosive mixture and connected with conductors 6 leading to a shock sensor switch, not shown. Vent holes 7, 8 and 81 are formed in the side walls of the respective stationary (2) and movable (3, 31) tubular members for the purpose of automatically controlling the extending and contracting speeds of the telescoping structure.

The features described above of this embodiment are substantially similar to those of one or another of the embodiments previously described. In this embodiment, however, a plurality (preferably four) of such telescoping structures are employed and secured to a vehicle at a proper location therein to jointly support a cushioning cloth or net 4c. To this end, in each telescoping structure, the movable tubular member 31, which in operation extends foremost, has a fixture 12 secured to the end plate 13, which closes the member 31 at its outer end. As indicated by the broken line, the net or cloth 4c is properly secured at an appropriate point thereon to the fixture 12.

FIGS. 9 and 10 illustrate one form of such embodiment, which is most recommendable in practice, and FIG. 13 schematically illustrates one practical application including four shock absorbing devices of the form suitably fixed to an automobile.

Referring to FIGS. 9 and 10, numeral 1 indicates a closed chamber or casing including a gas producing element 5 and four telescoping strutures are radially fixed to the casing in an equilateral rectangular arrangement. Each of the telescoping structures includes a stationary cylindrical tubular member 2 or 2a secured to the wall of the casing 1 and held in communication with its interior space through a gas port 15 formed in the casing wall. Four movable tubular members 3, 31, 32, 33 or 3a, 31a, 32a, 33a are slidably fitted in the stationary member 2 or 2a in that order to complete the telescoping structure. A fixture 12 or 12a is secured to the outer end of one of the tubular members 3 or 3a, which is operation extends foremost, and a net or cloth 4c, square in shape, is secured at its respective corners to such fixtures 12 provided on the respective four telescoping structures. As shown in FIG. 9, the net or cloth 4c will be fully stretched when the four telescoping structures are extended under the gas pressure produced therein by gas producing element 5 in the same manner as described in connection with the previous embodiments. FIG. 10 shows the device in its normal or inoperative state with the telescoping structures contracted allowing the net 4c to shrink.

FIGS. 11 and 12 illustrate a modification of the embodiment shown in FIGS. 9 and 10. As apparent from FIG. 11, the four tubular telescoping structures are each comprised of a multitude of interfitting arcuate tubular members, including a stationary tubular member 2a and movable tubular members 3, 31 and 32, and are extensible into a curved formation divergently from each other. Obviously, this arrangement has an advantage over the embodiment shown in FIGS. 9 and 10 that it enables use of a larger net or cloth 4c. FIG. 12 illustrates the net 4c in its state stretched out as the four telescoping structures are extended.

FIG. 13 illustrates an application to an automobile of a number of the inventive devices of the form shown in FIGS. 9, 10 and 11, as referred to hereinbefore. Naturally, the devices in such application are arranged so that in a collision of the automobile the nets or cloths 4c are each forced to jet out toward the rider's body A or B in a direction opposite to that in which the body is thrown forward in a collision and thus positively prevent the rider's body from striking against the front window glass or other part of the automobile in any violent fashion.

Though the above description has been made principally in connection with an automobile, the device of the present invention is applicable to any high speed transport means with a rider or riders thereon, including airplanes, electric cars and surface vessels.

Although several embodiments of the present invention have been illustrated and described, it will be apparent to those skilled in the art that various changes and modifications may be made therein without departing from the spirit of the invention or from the scope of the appended claims.

What is claimed is:

1. A shock absorbing device for protecting a rider in a high speed vehicle such as an automobile in collision, comprising:
    a stationary tubular member secured to the vehicle, the stationary tubular member being characterized by the presence of a first vent means in the side wall thereof;
    at least one movable tubular member characterized by the presence of a second vent means in the side wall thereof, the movable tubular member being arranged in a telescopic interfitting relation with the stationary tubular member;
    gas producing means operable by a shock sensor means to rapidly produce gases in a cavity formed between the interfitting tubular members, the gases causing the movement of the movable tubular member such that the movement thereof causes varying degrees of alignment and misalignment of the first and second vent means whereby the drawing in of atmospheric air and the letting out of the gases produced in the tubular members may be achieved; and
    a cushioning member secured to the outer end of the movable tubular member for yielding engagement with the rider's body.

2. A device as claimed in claim 1, in which said cushioning member comprises a bag adapted to be fed with the gases produced in said stationary and movable tubular members through aperture means said bag being normally held in a folded state and rapidly inflatable with the gases fed therein.

References Cited

UNITED STATES PATENTS

| | | | |
|---|---|---|---|
| 3,487,710 | 1/1970 | Fergle | 60—26.1 X |
| 2,899,214 | 8/1959 | D'Antini | 280—150 ABX |
| 3,314,229 | 5/1967 | Peterson | 60—26.11 |
| 3,624,810 | 11/1971 | Hass | 280—150 A |
| 2,806,737 | 9/1957 | Maxwell | 296—84 K |
| 2,516,902 | 8/1950 | Musser | 60—26.1 X |
| 2,781,203 | 2/1957 | Kurilenko | 280—150 B |
| 3,580,603 | 5/1971 | Chute | 280—150 AB |
| 2,902,292 | 9/1959 | Land | 180—102 X |

KENNETH H. BETTS, Primary Examiner

U.S. Cl. X.R.

60—26.1; 280—150 B